(12) United States Patent
Moon et al.

(10) Patent No.: US 11,261,390 B2
(45) Date of Patent: Mar. 1, 2022

(54) APPARATUS AND METHOD OF PREPARING SYNTHETIC FUEL USING NATURAL GAS

(71) Applicant: KOREA INSTITUTE OF SCIENCE AND TECHNOLOGY, Seoul (KR)

(72) Inventors: Dong Ju Moon, Seoul (KR); Seol-A Shin, Seoul (KR); Eun Hyeok Yang, Seoul (KR); Young-su Noh, Seoul (KR); Gihoon Hong, Seoul (KR); Ji In Park, Seoul (KR); Jae Sun Jung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/126,404

(22) Filed: Sep. 10, 2018

(65) Prior Publication Data

US 2020/0080013 A1    Mar. 12, 2020

(51) Int. Cl.
*B01J 8/00* (2006.01)
*C10G 2/00* (2006.01)
(Continued)

(52) U.S. Cl.
CPC ............... *C10L 1/02* (2013.01); *B01J 8/001* (2013.01); *C10G 2/332* (2013.01); *C10G 2/341* (2013.01);
(Continued)

(58) Field of Classification Search
None
See application file for complete search history.

(56) References Cited

U.S. PATENT DOCUMENTS 6,726,852 B2   4/2004  Iijima et al.
6,958,363 B2 * 10/2005 Espinoza ............... C01B 3/382
                                                    208/106
(Continued)

FOREIGN PATENT DOCUMENTS

JP    2004-516219 A    6/2004
KR    10-0975390 B1    8/2010
(Continued)

OTHER PUBLICATIONS

Gabriele Centi et al., Can We Afford to Waste Carbon Dioxide? Carbon Dioxide as a Valuable Source of Carbon for the Production of Light Olefins, ChemSusChem, 2011, pp. 1265-1273, vol. 4.
(Continued)

*Primary Examiner* — Jennifer A Leung
(74) *Attorney, Agent, or Firm* — Goldilocks Zone IP Law (57) ABSTRACT

Disclosed is an apparatus and method of preparing synthetic fuel using natural gas extracted from a stranded gas field on land or at sea as a raw material through a compact GTL process or a GTL-FPSO process. A parallel-type gas purification unit for controlling a molar ratio of synthetic gas and a concentration of carbon dioxide in the synthetic gas, in which a $CO_2$ separation device and a bypass unit are disposed in parallel, is provided and, thus, the gas purification unit may prepare the synthetic gas by a steam carbon dioxide reforming (SCR) reaction using natural gas having different $CO_2$ contents of various stranded gas fields and then supply the synthetic gas having an optimum composition suitable for a Fischer-Tropsch synthesis.

5 Claims, 3 Drawing Sheets

(51) Int. Cl.
*C10L 1/02* (2006.01)
*C10L 3/10* (2006.01)
*C01B 3/34* (2006.01)

(52) U.S. Cl.
CPC ............... *C10L 3/103* (2013.01); *C10L 3/106* (2013.01); *B01J 2208/00548* (2013.01); *B01J 2208/00628* (2013.01); *C01B 2203/0233* (2013.01); *C01B 2203/0238* (2013.01); *C01B 2203/043* (2013.01); *C01B 2203/0415* (2013.01); *C01B 2203/0475* (2013.01); *C01B 2203/062* (2013.01); *C01B 2203/127* (2013.01); *C01B 2203/1241* (2013.01); *C01B 2203/1647* (2013.01); *C01B 2203/1671* (2013.01); *C01B 2203/1685* (2013.01); *C10L 2290/08* (2013.01); *C10L 2290/10* (2013.01); *C10L 2290/42* (2013.01); *C10L 2290/541* (2013.01); *C10L 2290/542* (2013.01); *C10L 2290/548* (2013.01)

(56) References Cited

U.S. PATENT DOCUMENTS

| | | | | |
|---|---|---|---|---|
| 7,485,767 | B2* | 2/2009 | Lattner | C01B 3/382 |
| | | | | 252/373 |
| 9,062,257 | B1* | 6/2015 | Agee | C07C 1/04 |
| 9,145,525 | B2* | 9/2015 | Chakravarti | C10K 1/004 |
| 2004/0102532 | A1* | 5/2004 | Landis | C01B 3/386 |
| | | | | 518/726 |
| 2005/0106086 | A1 | 5/2005 | Tomlinson et al. | |
| 2007/0232706 | A1* | 10/2007 | Shah | B01D 53/0476 |
| | | | | 518/703 |
| 2011/0130474 | A1* | 6/2011 | Moon | B01J 19/0093 |
| | | | | 518/702 |
| 2015/0299597 | A1 | 10/2015 | Meyer et al. | |
| 2016/0186071 | A1* | 6/2016 | Moon | C10G 2/332 |
| | | | | 208/107 |
| 2018/0210596 | A1 | 7/2018 | Ding et al. | |

FOREIGN PATENT DOCUMENTS

| | | |
|---|---|---|
| KR | 10-1152666 B1 | 5/2012 |
| KR | 10-1157205 B1 | 6/2012 |
| KR | 10-2013-0005848 A | 1/2013 |
| KR | 10-2014-0094999 A | 7/2014 |
| KR | 10-2016-0077860 A | 7/2016 |

OTHER PUBLICATIONS

Yali Yao et al., Fischer-Tropsch Synthesis Using H2/CO/CO2 Syngas Mixtures over a Cobalt Catalyst, Ind. Eng. Chem. Res. Jul. 8, 2010, pp. 11061-11066, vol. 49.

Andreas Jess et al., Modeling of Multi-Tubular Reactors for Fischer-Tropsch Synthesis, Chem. Eng. Technol., 2009, pp. 1164-1175, vol. 32, No. 8.

Tae Seok Lee et al., Mathematical Modeling and Numerical Simulation of a Fischer-Tropsch Packed Bed Reactor and Its Thermal Management for Liquid Hydrocarbon Fuel Production using Biomass Syngas, Energy Fuels, Jan. 8, 2012, pp. 1363-1379, vol. 26.

José Antonio Díaz et al., Influence of CO2 co-feeding on Fischer-Tropsch fuels production over carbon nanofibers supported cobalt catalyst, Catalysis Communications 44, Jul. 26, 2014, pp. 57-61.

* cited by examiner

APPARATUS AND METHOD OF PREPARING SYNTHETIC FUEL USING NATURAL GAS

BACKGROUND

(a) Technical Field

The present disclosure relates to an apparatus and method of preparing synthetic fuel using natural gas. More particularly, it relates to an apparatus and method of preparing synthetic fuel which uses natural gas extracted from a stranded gas field as a raw material and is applied to a compact GTL process on land and a GTL-FPSO process at sea so as to prepare the synthetic fuel.

(b) Background Art

In spite of increase in international crude oil supply due to the U.S. shale gas revolution, the OPEC member countries, such as Saudi Arabia, etc., rejected reduction of crude oil production and, thus, oversupply of oil was intensified and international oil prices have sharply declined. However, as oil producing countries and oil non-producing countries have recently agreed to cut crude oil production, international oil prices are on the rise and thus crude oil trades at $50 to $55 per barrel.

From now on, international oil prices are expected to return to $80 per barrel due to recovery of global demand in 2020 (IEA, Medium-Term Oil Market Report 2016). However, oil prices are expected to rise due to a limit in the amount of oil reserves in oil fields in the long term and, thus, research and development of substitution liquid fuels for petroleum are required.

Particularly, technologies for CNG/LNG, methanol, GTL, etc., using natural gas having abundant reserves as compared to oil are in the spotlight, and, among technologies for producing synthetic fuel from such natural gas, technology of producing liquid fuel from gas which has having various advantageous, i.e., the Gas-to-Liquids (GTL) technology, is in the spotlight as future energy technology.

Further, GTL technology suitable for the marine environment, called GTL-Floating, Production Storage and Offloading (GTL-FPSO) technology, is known. In the GTL-FPSO technology, a compact GTL process in which synthetic gas is prepared from natural gas including methane as a main ingredient and then synthetic fuel is prepared using the synthetic gas, and an FPSO system which is a floating crude oil production, storage and offloading facility are combined.

Target objects of such GTL-FPSO technology are natural gas of stranded gas fields and associated gas of oil and gas fields.

World total gas reserves are estimated at 6,000 tcf (=160 trillion cubic meters) and, due to technical improvement, latent gas reserves are estimated at 13,000 tcf.

Thereamong, 75% of gas exists in stranded gas fields, and natural gas of stranded gas fields and associated gas of oil and gas fields in the range of 0.5-5 tcf, which are located in the deep sea and are not developed in consideration of physical and economic factors, are in the spotlight.

However, in order to completely execute a GTL-FPSO process applicable to the marine environment, it is necessary to secure facility sizes, stability, operability and reliability of the process, prices and economic feasibility of the process.

That is, in the marine environment, there is a limit to secure the facility sizes and weights and economic feasibility of the process due to a limited space, and the facilities included in respective unit processes in the marine environment are considered as being similar to facilities included in respective unit processes on land but substantially have different shapes, sizes and weights from those of the facilities on the ground.

Further, the overall size of the FPSO system is determined when its respective facilities of 2,000-3,000 tons are modulated and arranged and, thus, the sizes and weights of the respective facilities are important, and safety and reliability of the FPSO process in consideration of rolling and pitching of the FPSO system due to requirement of continuous operation throughout the year except for a catalyst replacement time are important.

However, so far, progress in infrastructure of the process suitable for the marine environment and a proof process thereof is very slow, and optimization and practical use of technologies using the GTL-FPSO technology are as yet insignificant.

As conventional methods of preparing synthetic fuel from stranded gas fields, Korean Patent Registration No. 10-1152666, filed by the applicant of the invention and registered, discloses an apparatus and method of producing liquid synthetic fuel from gas extracted from a stranded gas field or associated gas extracted from an oil field through a GTL-FPSO system including a reforming reactor and a liquid carbon compound manufacturing device provided on a vessel, and discloses a process including desulfurization, reforming reaction, conversion reaction, upgrading, etc., and technology using an internal generator.

Further, Korean Patent Registration No. 10-1157205, filed by the applicant of the invention and registered, discloses a dimethyl ether (DME)-FPSO apparatus usable in stranded gas fields and a method of manufacturing dimethyl ether using the same, in which dim ethyl ether is produced from gas extracted from a stranded gas field through the DME-FPSO system including a reforming reactor and a dimethyl ether reactor provided on a vessel.

Further, U.S. Patent Publication No. 2008-210596, U.S. Pat. No. 6,726,852, U.S. Patent Publication No. 2005-106086, etc. also discloses methods and apparatuses of preparing synthetic fuel through reforming reaction and Fischer-Tropsch synthesis reaction using a GTL-FPSO apparatus, as similar systems to those of the above Patent Documents.

In addition, Korean Patent Registration No. 10-1272082 discloses use of different catalysts in a Fischer-Tropsch synthesis reactor depending on compositional molar ratios ($H_2$/CO) of synthetic gas supplied to the reactor, and Korean Patent Registration No. 10-975390 discloses a Fischer-Tropsch synthesis reaction apparatus in which a reactor provided with a cobalt-based catalyst and a reactor provided with an iron-based catalyst are separately provided.

These conventional technologies are the same in that synthetic fuel is prepared through reforming reaction and Fischer-Tropsch synthesis reaction using the GTL-FPSO apparatus, but propose effective methods of preparing synthetic fuel from natural gas using differences or technical features in respective processes.

Further, Korean Patent Laid-open Publication No 10-2016-0077860, filed by the applicant of the invention, discloses an apparatus and method of preparing synthetic fuel using a GTL apparatus and an FPSO process, usable in stranded gas fields, in which the synthetic fuel is prepared under optimum conditions according to a ratio of carbon dioxide included in a stranded gas field so as to have increased economic feasibility, productivity and efficiency.

However, among the entire process of preparing synthetic fuel from synthetic gas, some unit processes still require increased efficiency.

Particularly, development of technology for improving energy utilization efficiency and carbon utilization efficiency by introducing an apparatus which may supplies an optimum supply suitable for synthesis reaction (Fischer-Tropsch synthesis reaction) to prepare synthetic fuel from synthetic gas, and effective process technology in a synthetic fuel reaction process through use of carbon dioxide is desperately needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art and it is an object of the present invention to provide an apparatus and method of preparing synthetic fuel through a GTL process using natural gas extracted from a stranded gas field on land or at sea as a raw material, which may be applied to various stranded gas fields on land and at sea with gas having different $CO_2$ contents, respond actively so as to prepare synthetic fuel desired by an arbitrary stranded gas field on land or at sea, and minimize restriction on preparation of the synthetic fuel due to the $CO_2$ content of raw gas.

It is another object of the present invention to provide an apparatus and method of preparing synthetic fuel using a GTL apparatus usable in stranded gas fields on land or a GTL apparatus and an FPSO process usable in stranded gas fields at sea, which may supply an optimum supply suitable for a synthesis reaction (Fischer-Tropsch synthesis reaction) to prepare synthetic fuel from synthetic gas and thus improve energy utilization efficiency and carbon utilization efficiency in an integrated process to prepare the synthetic fuel from natural gas including $CO_2$ of a stranded gas field.

It is yet another object of the present invention to provide an apparatus and method of preparing synthetic fuel using natural gas of a stranded gas field on land or at sea, which may recover and recycle residual $CO_2$ in synthetic gas as a reaction raw material to prepare the synthetic gas and thus maximally prevent and suppress energy loss and greenhouse gas emissions.

In one aspect, the present invention provides an apparatus of preparing synthetic fuel using natural gas, including a liquid separator configured to separate $C_5^+$ condensate and oil from the natural gas supplied from a stranded gas field, a desulfurizer configured to remove sulfur from $C_1$-$C_4$ gas obtained by separating the $C_5^+$ condensate and oil from the natural gas by the liquid separator, a pre-reformer configured to convert higher hydrocarbons having 2 or more carbon atoms in desulfurized gas, obtained by the desulfurizer, into methane, a reforming reactor configured to generate synthetic gas including hydrogen ($H_2$) and carbon monoxide (CO) through a Steam Carbon dioxide Reforming (SCR) reaction to reform methane and carbon dioxide into steam, after a pre-reforming process executed by the pre-reformer, a Fischer-Tropsch synthesis reactor configured to generate the synthetic fuel from the synthetic gas generated by the reforming reactor through a Fischer-Tropsch synthesis reaction, and a gas purification unit configured to control a $H_2$/CO molar ratio of the synthetic gas and a concentration of carbon dioxide in the synthetic gas and including a $CO_2$ separation device configured to separate and remove carbon dioxide from the synthetic gas and a bypass unit configured to divert a part of the synthetic gas so as not to pass through the $CO_2$ separation device, the $CO_2$ separation device and the bypass unit being disposed in parallel between the reforming reactor and the Fischer-Tropsch synthesis reactor.

In another aspect, the present invention provides a method of preparing synthetic fuel using natural gas, including executing a gas-liquid separation process of separating $C_5^+$ condensate and oil from the natural gas supplied from a stranded gas field, executing a desulfurization process of removing sulfur from $C_1$-$C_4$ gas obtained by separating the $C_5^+$ condensate and oil from the gas in the gas-liquid separation, executing a pre-reforming process of converting higher hydrocarbons having 2 or more carbon atoms in desulfurized gas, obtained in the desulfurization process, into methane, executing a reforming reaction process of generating synthetic gas including hydrogen ($H_2$) and carbon monoxide (CO) through a Steam Carbon dioxide Reforming (SCR) reaction to reform methane and carbon dioxide into steam, after the pre-reforming process, executing a Fischer-Tropsch synthesis process of generating the synthetic fuel from the synthetic gas, generated in the reforming reaction process, through a Fischer-Tropsch synthesis reaction, and executing a carbon dioxide adjustment and separation/purification process of controlling a $H_2$/CO molar ratio of the synthetic gas supplied from the reforming reaction process to the Fischer-Tropsch synthesis process and a concentration of carbon dioxide in the synthetic gas, using a gas purification unit including a $CO_2$ separation device configured to separate and remove carbon dioxide from the synthetic gas supplied from the reforming reaction process and a bypass unit configured to divert a part of the synthetic gas so as not to pass through the $CO_2$ separation device, the $CO_2$ separation device and the bypass unit being disposed in parallel.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawings.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, it will be understood that, when a part "includes" an element, the part does not exclude presence of other elements and may further include other elements, unless stated otherwise.

The present invention relates to an apparatus and method of preparing synthetic fuel in which the synthetic fuel is prepared using natural gas extracted from a stranded gas field as a raw material through a compact GTL process or a GTL-FPSO process.

More particularly, the present invention relates to an apparatus and method of executing a high value added process to prepare synthetic fuel using a GTL process, in which the synthetic fuel is prepared from natural gas (stranded gas) in a stranded gas field using a compact GTL apparatus and process of preparing synthetic fuel usable in stranded gas fields on land and a compact GTL and an FPSO process usable in stranded gas fields at sea.

Further, the present invention provides an apparatus and method of preparing synthetic fuel in which synthetic gas is prepared by steam carbon dioxide reforming reaction using natural gas having different carbon dioxide ($CO_2$) contents of various stranded gas fields and then passes through a gas purification unit including a bypass unit and a $CO_2$ separator, connected in parallel, and the synthetic fuel is then prepared from the synthetic gas.

In addition, the present invention provides an apparatus of preparing synthetic fuel, which includes a gas purification unit to supply an optimum synthetic gas supply to a Fischer-Tropsch Synthesis (FTS) reaction to generate the synthetic fuel from synthetic gas, and a method of preparing synthetic fuel using the same.

For this purpose, the apparatus and method of preparing synthetic fuel in accordance with the present invention are improvements over the apparatus and method of preparing synthetic fuel disclosed in Korean Patent Laid-open Publication No 10-2016-0077860, filed by the applicant of the invention (hereinafter referred to as "Patent Document 1"), and the apparatus of preparing synthetic fuel in accordance with the present invention further includes a gas purification unit for controlling a molar ratio of synthetic gas which adjusts an amount of carbon dioxide in raw gas supplied to a reforming reactor and in the synthetic gas supplied to a Fischer-Tropsch synthesis reactor, in addition to the components of the apparatus disclosed in Patent Document 1.

Further, the method of preparing synthetic fuel in accordance with the present invention further includes adjusting an amount of carbon dioxide in raw gas and synthetic gas using the gas purification unit so as to control a molar ratio of the synthetic gas supplied to the Fischer-Tropsch synthesis reactor.

According to such a configuration, the apparatus and the method in accordance with the present invention may adjust an amount of carbon dioxide in synthetic gas supplied to the Fischer-Tropsch synthesis reactor through the gas purification unit, and be applied to various stranded gas fields on land and at sea having natural gas including different carbon dioxide contents.

Further, since an amount of carbon dioxide ($CO_2$) in synthetic gas supplied from the reforming reactor to the Fischer-Tropsch synthesis reactor is adjusted, a constant compositional ratio of the synthetic gas, particularly a constant molar ratio of hydrogen ($H_2$) to carbon monoxide (CO) (hereinafter, referred to "$H_2$/CO molar ratio"), in the synthetic gas may be maintained regardless of a carbon dioxide content of natural gas in a stranded gas field and the synthetic gas in which the $H_2$/CO molar ratio is adjusted to an optimal value and the $CO_2$ content is adjusted to be within a range of specific % may be supplied to the Fischer-Tropsch synthesis reactor.

Hereinafter, the configuration of an apparatus of preparing synthetic fuel in accordance with one embodiment of the present invention will be described with reference to the accompanying drawings.

Figure 1:
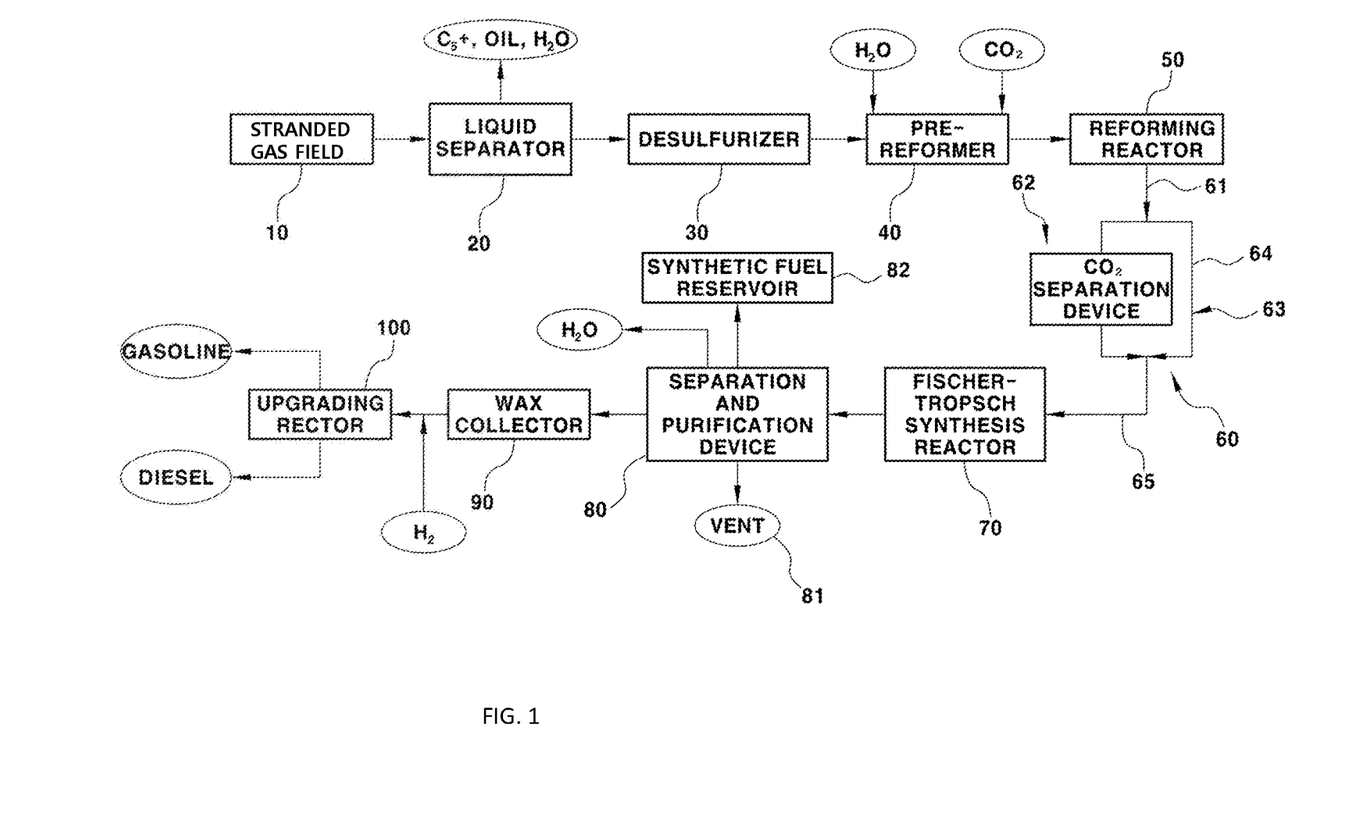
FIG. 1 is a block diagram systematically illustrating one example of an apparatus of preparing synthetic fuel using a compact GTL process in accordance with the present invention.

FIG. 1 is a block diagram systematically illustrating one example of an apparatus of preparing synthetic fuel using a compact GTL process in accordance with the present invention, particularly illustrating main elements of an apparatus of preparing synthetic fuel through a GTL-FPSO process using natural gas supplied from a stranded gas field 10 as a raw material.

As exemplarily shown in FIG. 1, the apparatus of preparing synthetic fuel in accordance with the present invention includes a liquid separator 20 to separate $C_5^+$ condensate and oil from natural gas (stranded gas) supplied from the stranded gas field 10, a desulfurizer 30 to remove sulfur from $C_1$-$C_4$ gas obtained by separating the $C_5^+$ condensate and oil from the natural gas by the liquid separator 20, a pre-reformer 40 to convert higher hydrocarbons having 2 or more carbon atoms in desulfurized gas, obtained by the desulfurizer 30, into methane, a reforming reactor 50 to generate synthetic gas including hydrogen ($H_2$) and carbon monoxide (CO) through a Steam Carbon dioxide Reforming (SCR) reaction to reform methane in raw gas pre-reformed and then supplied by the pre-reformer 40 and carbon dioxide included in the stranded gas into steam, a Fischer-Tropsch synthesis reactor 70 to generate the synthetic fuel from the synthetic gas generated by the reforming reactor 50 through a Fischer-Tropsch synthesis reaction, and a gas purification unit 60 to adjust an amount of carbon dioxide in the synthetic gas supplied from the reforming reactor 50 to the Fischer-Tropsch synthesis reactor 70.

Among the above-described elements, the reforming reactor 50 is a reactor which prepares synthetic gas from raw gas supplied from the pre-reformer 40, i.e., raw gas including methane, carbon dioxide and steam ($H_2O$, injected into the pre-reformer 40), through the SCR reaction, and the Fischer-Tropsch synthesis reactor 70 is a reactor which prepares a liquid carbide, i.e., synthetic fuel, from the synthetic gas supplied from the reforming reactor 50 through the Fischer-Tropsch synthesis reaction.

Further, the raw gas for preparing synthetic gas, supplied from the pre-reformer 40, may be supplied to the reforming reactor 50 after a carbon dioxide content of the raw gas is adjusted. Here, in order to adjust a molar ratio of methane ($CH_4$) to steam ($H_2O$) to carbon dioxide ($CO_2$) in the raw gas to a specific ratio, steam ($H_2O$) and carbon dioxide ($CO_2$) may be injected into the pre-reformer 40, as exemplarily shown in FIG. 1.

Further, the synthetic gas supplied from the pre-reformer 50 is supplied to the Fischer-Tropsch synthesis reactor 70 after the content of carbon dioxide in the synthetic gas is adjusted by the gas purification unit 60.

Here, a $H_2/CO$ molar ratio of the synthetic gas supplied to the Fischer-Tropsch synthesis reactor 70 may be adjusted preferably to 1.8-2.2, more preferably to 2.0-2.05 by adjusting the amount of carbon dioxide in the synthetic gas using the gas purification unit 60.

As a catalyst which can be used in the Fischer-Tropsch synthesis reactor 70 with respect to the synthetic gas having the above $H_2/CO$ molar ratio, i.e., a catalyst for the Fischer-Tropsch synthesis reaction, a cobalt (Co)-based catalyst may be used.

In the apparatus of preparing synthetic fuel in accordance with the present invention, the Fischer-Tropsch synthesis reactor 70 may employ a fixed bed reactor or a microchannel reactor, without being limited thereto.

In addition, the apparatus of preparing synthetic fuel in accordance with the present invention may further include a separation and purification device 80 to purify crude synthetic fuel in a liquid state, acquired by the Fischer-Tropsch synthesis reactor 70, by separating steam or gas from the synthetic fuel, and an upgrading reactor 110 to convert carbon compounds having low flowability, such as wax, separated from the synthetic fuel by the separation and purification device 80, into gasoline, diesel and kerosene.

A vent 81 to exhaust separated gas to the outside may be installed at the separation and purification device 80, and the entirety or a part of the separated gas may be exhausted through the vent 81 and then supplied to at least one of the pre-reformer 40, the reforming reactor 50, the Fischer-Tropsch synthesis reactor 70 or a separate hydrogen manufacturing process for the purpose of recycling.

In FIG. 1, reference numeral 82 denotes a synthetic fuel reservoir to store a final product corresponding to the liquid carbide, i.e., the synthetic fuel purified by the separation and purification device 80.

Further, reference numeral 90 denotes a wax collector to collect the carbon compounds having low flowability, such as wax, separated from the synthetic fuel by the separation and purification device 80, and the wax collector 90 supplies the collected carbon compounds having low flowability, such as wax, to the upgrading reactor 100 so as to convert the carbon compounds into gasoline, diesel and kerosene.

Consequently, the apparatus of preparing synthetic fuel having the above-described configuration may prepare clean synthetic fuel through the GTL-FPSO process on a vessel in a stranded gas field at sea or the compact GTL process using natural gas of a stranded gas field on land.

Further, the method of preparing synthetic fuel in accordance with the present invention includes executing a gas-liquid separation process of separating $C_5^+$ condensate and oil from gas supplied from the stranded gas field 10 using the liquid separator 20, executing a desulfurization process of removing sulfur from $C_1$-$C_4$ gas obtained by separating the $C_5^+$ condensate and oil from the gas in the gas-liquid separation using the desulfurizer 30, executing a pre-reforming process of converting higher hydrocarbons having 2 or more carbon atoms in desulfurized gas, obtained in the desulfurization process, into methane using the pre-reformer 40, executing a reforming reaction process of generating synthetic gas including hydrogen ($H_2$) and carbon monoxide (CO) through the Steam Carbon dioxide Reforming (SCR) reaction to reform methane supplied by the pre-reforming process and carbon dioxide included in the stranded gas into steam, executing a Fischer-Tropsch synthesis process of generating synthetic fuel from the synthetic gas supplied from the reforming reaction process through Fischer-Tropsch synthesis reaction using the Fischer-Tropsch synthesis reactor 70, and executing a carbon dioxide adjustment and separation/purification process of adjusting an amount of carbon dioxide in the synthetic gas supplied from the reforming reaction process to the Fischer-Tropsch synthesis process using the gas purification unit 60.

In the method of preparing synthetic fuel in accordance with the present invention, the reforming reaction process is a process of preparing synthetic gas through the reforming reaction of methane, carbon dioxide and steam of the pre-reformed raw gas under designated reaction conditions (for example, 20 bar and 890° C.).

That is, in the reforming reaction process, the raw gas including methane, carbon dioxide included in the stranded gas, and steam ($H_2O$, injected into the pre-reformer 40) is supplied from the pre-reforming process and then synthetic gas is prepared from the raw gas through the SCR reaction.

Further, the Fischer-Tropsch synthesis process is a process of preparing synthetic fuel, i.e., liquefied carbides, from the synthetic gas supplied from the reforming reaction process through the Fisher-Tropsch synthesis reaction.

Here, hydrocarbons of $C_2^+$ or higher are converted into methane in the pre-reforming process and then supplied to the reforming reaction process, and the synthetic gas prepared in the reforming reaction process is supplied to the Fischer-Tropsch synthesis process after the carbon dioxide content of the synthetic gas is adjusted in the carbon dioxide adjustment and separation/purification process.

Here, a $H_2/CO$ molar ratio of the synthetic gas supplied to the Fischer-Tropsch synthesis process may be adjusted preferably to 1.8-2.2, more preferably to 2.0-2.05 by adjusting the amount of carbon dioxide in the synthetic gas in the carbon dioxide adjustment and separation/purification process, and, as a catalyst in the Fischer-Tropsch synthesis process, a cobalt (Co)-based catalyst may be used.

In addition, the method of preparing synthetic fuel in accordance with the present invention may further include executing a separation and purification process of purifying crude synthetic fuel in a liquid state, acquired in the Fischer-Tropsch synthesis process, by separating steam or gas from the synthetic fuel, and executing an upgrading reaction process of converting carbon compounds having low flowability, such as wax, separated from the synthetic fuel in the separation and purification process, into gasoline, diesel and kerosene.

Consequently, the method of preparing synthetic fuel having the above-described configuration may prepare clean synthetic fuel through the GTL-FPSO process on a vessel in a stranded gas field at sea or the compact GTL process in a stranded gas field on land.

The respective elements of the apparatus of preparing synthetic fuel in accordance with the present invention, i.e., the liquid separator 20, the desulfurizer 30, the pre-reformer 40, the reforming reactor 50, the Fischer-Tropsch synthesis reactor 70, the separation and purification device 80, the synthetic fuel reservoir 82, the wax collector 90, the upgrading reactor 100, etc., are described in detail in Patent Document 1 and processes executed by the respective elements and functions of the respective elements are described in detail in Patent Document 1, and a detailed description thereof will thus be omitted.

Further, as described above, the present invention is characterized in that the synthetic fuel preparation apparatus of the present invention further includes the gas purification unit 60 to control the molar ratio of the synthetic gas, in addition to the elements of the apparatus disclosed in Patent Document 1, and the synthetic fuel preparation method of the present invention further includes the carbon dioxide adjustment and separation/purification process to adjust the amount of carbon dioxide using the gas purification unit 60, in addition to the processes of the method disclosed in Patent Document 1.

Here, the gas purification unit 60 will be described in more detail.

The gas purification unit 160 in the present invention may have the configuration of a carbon dioxide adsorptive purification unit which adjusts an amount of carbon dioxide by adsorbing carbon dioxide from synthetic gas passing through the carbon dioxide adsorptive purification unit, and may include a Pressure Swing Adsorption (PSA) device which executes separation of carbon dioxide from gas in a Pressure Swing Adsorption (PSA) method, as a $CO_2$ separation device.

Otherwise, the gas purification unit 60 may include one selected from various $CO_2$ separation devices which may adjust an amount of carbon dioxide by separating carbon dioxide from synthetic gas, for example, a $CO_2$ separation device which may execute a $CO_2$ separation process, such as a wet amine process or a membrane process.

Here, a $CO_2$ separation device executing a wet process, such as an amine process, and a dry process, such as a PSA process or a membrane process, may be applied to the compact GTL process executed on land, and a $CO_2$ separation device executing a dry process, such as a PSA process, may be applied to the GTL-FPSO process executed at sea.

Particularly, the gas purification unit 60 in accordance with the present invention may be disposed between the reforming reactor 50 and the Fischer-Tropsch synthesis reactor 70, and have a parallel configuration in which a $CO_2$ separation device 62 and a bypass unit 63 are connected in parallel.

The gas purification unit 60 controls carbon dioxide ($CO_2$) to have a concentration optimized to the Fischer-Tropsch synthesis reaction while maintaining a $H_2/CO$ molar ratio of synthetic gas supplied to the Fischer-Tropsch synthesis reactor 70, which is adjusted to 1.8-2.2.

That is, the gas purification unit 60 may maintain the $H_2/CO$ molar ratio of the synthetic gas supplied to the Fischer-Tropsch synthesis reactor 70 at a specific value or within a designated range so that the carbon dioxide content in the synthetic gas is small, and supply optimum synthetic gas favorable to the Fischer-Tropsch synthesis reaction executed using the cobalt-based catalyst to the Fischer-Tropsch synthesis reactor 70.

Here, the $H_2/CO$ molar ratio of the synthetic gas supplied to the Fischer-Tropsch synthesis reactor 70 may be adjusted preferably to 1.8-2.2, more preferably to 2.0-2.05.

For example, the $H_2/CO$ molar ratio of the synthetic gas supplied to the Fischer-Tropsch synthesis reactor 70 through the gas purification unit 60 may be adjusted to 2 and, here, a $CH_4$ to $H_2O$ to $CO_2$ molar ratio of the raw gas supplied to the reforming reactor 50 may be adjusted to 1:1.6:0.7.

Consequently, the gas purification unit 60 disposed at the rear of the reforming reactor 50, which will be described later, may prepare synthetic gas having an optimum compositional molar ratio from gas of the stranded gas field 10 having various carbon dioxide contents, for example, gas of the stranded gas field having a $CH_4$ to $H_2O$ to $CO_2$ molar ratio of 1:0.8-1.8:0.7-15.4 and supply the prepared synthetic gas to the Fischer-Tropsch synthesis reactor 70.

In the present invention, the gas purification unit 60 including a PSA device, as one example of the $CO_2$ separation device 62, and the bypass unit 63 which are connected in parallel, executes the above-described carbon dioxide adjustment and separation/purification process, thus optimizing a compositional ratio of synthetic gas used in the Fischer-Tropsch synthesis reaction and producing desired synthetic gas through the SCR process using natural gas in the stranded gas field 10 having various carbon dioxide contents.

Further, the gas purification unit 60 in which the $CO_2$ separation device 62 and the bypass unit 63 are connected in parallel adjusts the carbon dioxide content in the synthetic gas and may thus minimize restriction on preparation of the synthetic fuel.

Further, even if the synthetic fuel preparation method of the present invention is applied to an arbitrary stranded gas field 10, the $H_2/CO$ molar ratio of the synthetic gas supplied to the Fischer-Tropsch synthesis reaction may be adjusted to 1.8-2.2 and the concentration of carbon dioxide may be adjusted through the SCR process and the carbon dioxide adjustment and separation/purification process and, thus, optimum synthetic gas suitable for the Fischer-Tropsch synthesis reaction may be supplied and energy utilization efficiency and carbon utilization efficiency of the integrated process for preparing synthetic fuel from natural gas of the stranded gas field 10 may be maximized.

Further, the gas purification unit 60 adjusts the amount of carbon dioxide in raw gas supplied to the reforming reactor 50, thus enabling use of a minimum amount of water and improving utilization efficiency of carbon dioxide.

Further, the PSA device 62 may separate carbon dioxide and, thus, residual carbon dioxide in gas may be recovered and recycled industrially during the process of preparing synthetic gas using gas of the stranded gas field 10 as a raw material and thereby energy loss and greenhouse gas emissions may be maximally suppressed.

With reference to FIG. 1, the gas purification unit 60 which is disposed between the reforming reactor 50 and the Fischer-Tropsch synthesis reactor 70 may employ a parallel-type gas purification unit in which the $CO_2$ separation device 62 and the bypass unit 63 are connected in parallel.

In more detail, the gas purification unit 60 of the present invention transmits synthetic gas, i.e., synthetic gas including hydrogen ($H_2$), carbon monoxide (CO) and a small amount of carbon dioxide ($CO_2$), prepared and supplied by the reforming reactor 50 so as to be used in the Fischer-Tropsch synthesis reaction for preparing synthetic fuel, selectively separates and removes carbon dioxide from the transmitted synthetic gas, and then supplies the synthetic gas including the adjusted amount of carbon dioxide to the Fischer-Tropsch synthesis reactor 70.

Such a gas purification unit 60 is disposed between the reforming reactor 50 and the Fischer-Tropsch synthesis reactor 70 and executes the carbon dioxide adjustment and separation/purification process to adjust the amount of carbon dioxide in the synthetic gas supplied to the Fischer-Tropsch synthesis reactor 70.

Here, the $CO_2$ separation device 62 of the gas purification unit 60 may be a PSA device which separates and removes carbon dioxide from the synthetic gas by selectively adsorbing carbon dioxide, and such a PSA device and the bypass unit 63 may be connected in parallel so as to form the parallel-type gas purification unit.

The gas purification unit 60, as exemplarily shown in FIG. 1, includes the $CO_2$ separation device 62, which transmits the synthetic gas supplied by the reforming reactor 50 through a first supply line 61, selectively separates and removes carbon dioxide from the transmitted synthetic gas, and supplies the synthetic gas including an adjusted amount of carbon dioxide to the Fischer-Tropsch synthesis reactor 70 through a second supply line 65, and the bypass unit 63, which includes a bypass line 64 branching off from the first supply line 61 and connected to the second supply line 65 and diverts a part of the synthetic gas through the bypass line 64 not to pass through the $CO_2$ separation device 62 so that the diverted part of the synthetic gas is supplied to the Fischer-Tropsch synthesis reactor 70 through the second supply line 65.

As such, the gas purification unit 60 includes the $CO_2$ separation device 62 which adjusts the amount of carbon dioxide by separating and removing carbon dioxide from the synthetic gas, and the $CO_2$ separation device 62 may be the PSA device which separates and remove carbon dioxide from the synthetic gas by adsorbing carbon dioxide.

Further, the gas purification unit 60 includes the bypass unit 63 which diverts a part of the synthetic gas not to pass through the $CO_2$ separation device 62. The synthetic gas divisionally flows to the $CO_2$ separation device 62 and the bypass unit 63, a part of the synthetic gas in which the amount of carbon dioxide is adjusted by the $CO_2$ separation device 62 and the other part of the synthetic gas diverted by the bypass unit 63 meet and then the synthetic gas is supplied to the Fischer-Tropsch synthesis reactor 70 in which the Fischer-Tropsch synthesis reaction of the synthetic gas is executed.

Here, the $CO_2$ separation device 62 may be the PSA device, as described above, and the PSA device may include a plurality of adsorbent beds filled with an adsorbent which may selectively adsorb and desorb carbon dioxide.

Here, as the adsorbent of the PSA device, various adsorbents may be used and, particularly, an activated carbon-based adsorbent may be used.

In the PSA device, while the synthetic gas passes through the adsorbent beds, carbon dioxide in the synthetic gas is adsorbed onto the adsorbent and, thus, the amount of carbon dioxide in the synthetic gas may be adjusted.

Further, adsorption and desorption of carbon dioxide may be alternately executed on the adsorbent beds in order and, during a process of desorbing carbon dioxide from the adsorbent beds, carbon dioxide desorbed from the adsorbent the may be emitted to the outside through an emission line so as to be recycled to the pre-reformer 40 or be used as a raw material.

As such, in the present invention, natural gas of the stranded gas field 10 is used as a raw material, and residual carbon dioxide in synthetic gas is recovered through the gas purification unit 60 and then recycled and reused as a reaction raw material.

Thereby, a utilization rate of carbon resource components included in carbon dioxide may be increased, energy loss may be prevented and greenhouse gas emissions may be maximally suppressed.

Figure 2:
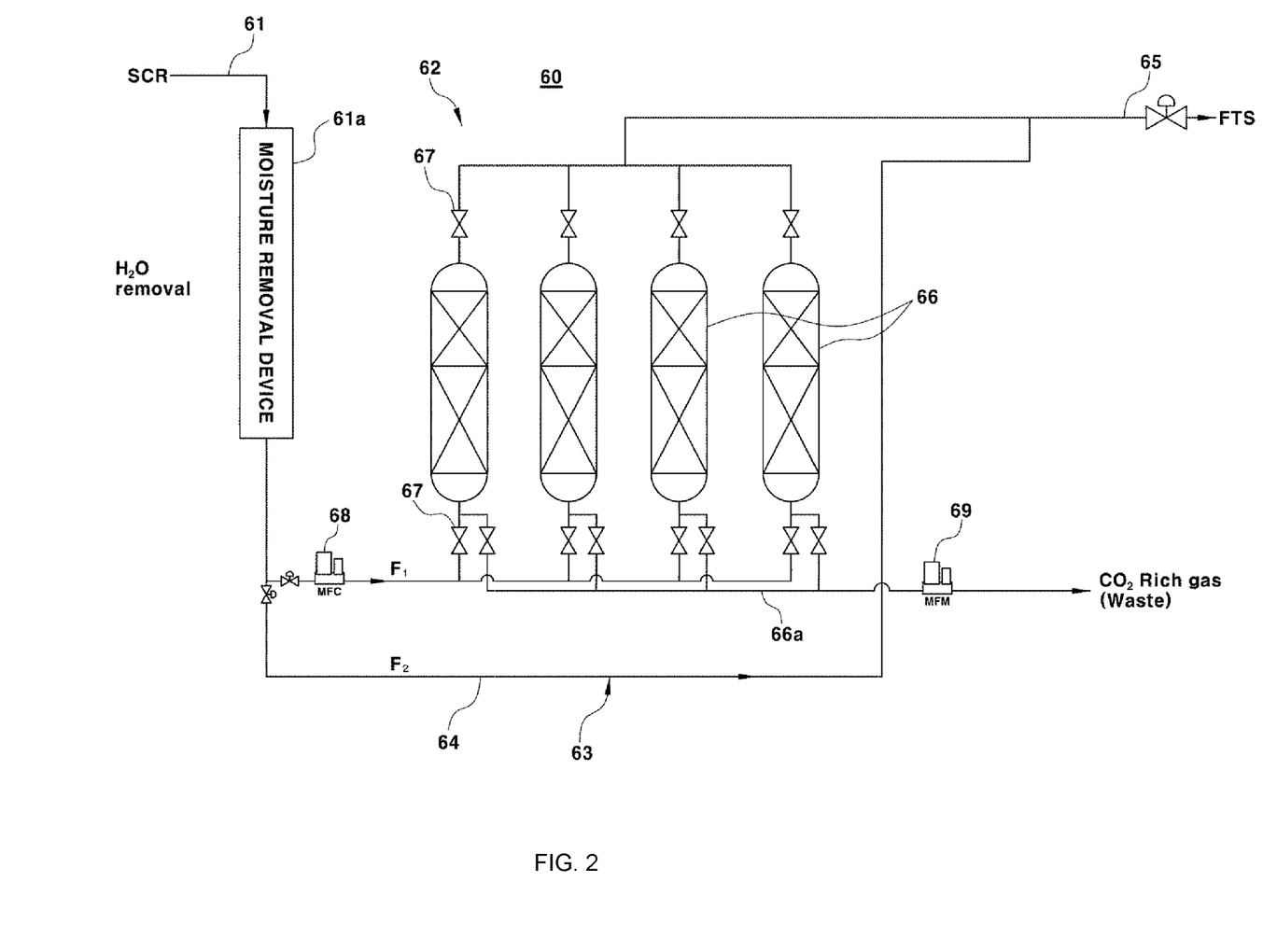
FIG. 2 is a schematic view illustrating the configuration of a gas purification unit of the synthetic fuel preparation apparatus in accordance with the present invention.

FIG. 2 is a schematic view illustrating the configuration of the gas purification unit 60 of the synthetic fuel preparation apparatus in accordance with the present invention.

In FIG. 2, reference numeral 61a denotes a moisture removal device which separates and removes moisture from synthetic gas before the synthetic gas supplied from the reforming reactor 50 to the gas purification unit 60 is distributed to the $CO_2$ separation device 62 and the bypass unit 63.

As exemplarily shown in FIG. 2, the gas purification unit 60 receives synthetic gas, generated by the reforming reactor 50 through the SCR process, through the first supply line 61, and the received synthetic gas is distributed to the $CO_2$ separation device 62, i.e., the PSA device, and the bypass unit 63, which are disposed in parallel.

Here, carbon dioxide in a part of the synthetic gas distributed to the PSA device 62 is adsorbed onto the adsorbent filling adsorbent beds 66 and is thus separated and removed, the other part of the synthetic gas distributed to the bypass unit 63 passes through the bypass line 64 and joins the part of the synthetic gas passed through the PSA device 62, and then the stream of the synthetic gas is supplied to the Fischer-Tropsch synthesis reactor 70 through the second supply line 65.

The gas purification unit 60 may have a flow control unit to control flow rates $F_1$ and $F_2$ or distribution amounts of the synthetic gas distributed to the PSA device 62 and the bypass unit 63.

In addition, the gas purification unit 60 may have flow control units to control the PSA process and emission flow rates, for example, a flow control unit to control flows and flow rates of synthetic gas supplied to the respective adsorbent beds 66, a flow control unit to control flows and flow rates of synthetic gas exhausted from the respective adsorbent beds 66, a flow control unit to control flow and an emission amount of carbon dioxide desorbed from the adsorbent.

The flow control units may include valves 67 and a mass flow controller (MFC) 68 which are installed at pipe lines of the gas purification unit 60, and a mass flow meter (MFM) 69 which is a flow measurement unit, etc. may be additionally installed at the pipe lines of the gas purification unit 60.

The configuration of the PSA device 62 of the gas purification unit 60 in which carbon dioxide is adsorbed onto and desorbed from the adsorbent is well known to those skilled in the art and a detailed description thereof will thus be omitted.

As such, in the present invention, in addition to adjustment of the $H_2/CO$ molar ratio of the synthetic gas supplied to the Fischer-Tropsch synthesis reactor 70 (preferably to 1.8-2.2, more preferably to 2.0-2.05) by the gas purification unit 60, the concentration of carbon dioxide ($CO_2$) in the synthetic gas may be adjusted preferably to 0.1-15 mol %, more preferably to 2.0-12 mol %.

Here, if the concentration of carbon dioxide ($CO_2$) is less than 0.1 mol %, the amount of carbon dioxide functioning as inert gas is excessively small and carbon dioxide exerts negative effects on control of the temperature of exothermic reaction and, if the concentration of carbon dioxide ($CO_2$) exceeds 15 mol %, carbon dioxide exerts positive effects on control of the temperature of the exothermic reaction but lowers productivity of synthetic fuel.

Although FIG. 2 exemplarily illustrates the configuration of the gas purification unit 60 disposed at the rear of the reforming reactor 50, the disclosure is not limited thereto and various modifications and changes of the configuration of the gas purification unit 60 are possible.

In the present invention, if process conditions of the gas purification unit 60, for example, a flow rate of raw gas supplied to the reforming reactor 50, a flow rate of synthetic gas supplied to the Fischer-Tropsch synthesis reactor 70, flow rates of the synthetic gas distributed from the gas purification unit 60 to the $CO_2$ separation device, i.e., the PSA device 62, and the bypass unit 63, a flow rate of the synthetic gas exhausted from the PSA device 62, etc., are controlled according to supply conditions, such as a compositional ratio, a carbon dioxide content, a flow rate, etc. of stranded gas supplied from the stranded gas field 10, synthetic gas having a desired optimum compositional ratio may be supplied to the Fischer-Tropsch synthesis reactor 70.

Particularly, synthetic fuel having an optimum $H_2/CO$ molar ratio suitable for the cobalt (Co)-based catalyst, i.e., a $H_2/CO$ molar ratio preferably of 1.8-2.2, more preferably of 2.0-2.05, may be supplied to the Fischer-Tropsch synthesis reactor 70, and carbon utilization efficiency may be increased through effective purification of the supply supplied to the Fischer-Tropsch synthesis reactor 70.

Further, through connection and configuration of the pipe lines of the gas purification unit 60 and flow rate adjustment, gas having an optimum flow rate may be supplied to the reforming reactor 50 and the Fisher-Tropsch synthesis reactor 70 and a flow rate of gas supplied to the Fisher-Tropsch synthesis reactor 70 may be selectively controlled.

In general, an equilibrium conversion rate in the reforming reaction is determined according to a molar ratio of $CH_4$ to $H_2O$ and $CO_2$, a reaction pressure and a reaction temperature, and the reforming reaction is mixed reforming reaction, in which a methane steam reforming reaction, a water-gas shift reaction, a methane degradation reaction, a carbon dioxide reforming reaction and a reverse water-gas shift reaction occur, and corresponds to an endothermic reaction requiring a large amount of heat.

Therefore, according to conventional research, in order to supply a large amount of heat to a reactor at a high temperature, a multi-tube fixed bed catalyst reactor is used and, in order to reduce the size of a facility for executing the reforming reaction, located in an FPSO system, the reforming reaction is executed at a high pressure of about 10-30 bar and a temperature of 800-1,000° C.

Further, in the reforming reaction process, not only operating conditions, such as temperature, pressure, etc., but also a compositional ratio of a raw material, particularly, a Steam-to-Carbon ratio (S/C ratio), may be maintained constant, the operating conditions may be determined according to a desired composition ratio of synthetic gas, and optimization thereof is needed.

Further, the Fischer-Tropsch synthesis reaction executed subsequent to the reforming reaction is a reaction in which synthetic fuel having an increased number of carbon atoms is produced starting from methane through consumption of carbon monoxide (CO) after desorption from the catalyst surface and continuous hydrogen supply.

Here, a consumption rate of hydrogen and carbon monoxide is influenced by a material of the catalyst and operating conditions. In general, the Fischer-Tropsch synthesis reaction requires lowering methane selectivity and, as methods of satisfying such a requirement, a method of lowering methane selectivity by raising a partial pressure of carbon monoxide and lowering a partial pressure of hydrogen and a method of lowering methane selectivity by increasing a partial pressure of water are well known.

According to recent research results, it is known that, in the Fischer-Tropsch synthesis reaction at a low temperature, carbon dioxide may be activated by a proper promoter.

Particularly, in the Fischer-Tropsch synthesis reaction using a cobalt-based catalyst, if carbon dioxide exists as supply gas in the general conditions (T=220° C., P=20 bar) of the Fischer-Tropsch synthesis reactor 70, carbon dioxide may exert a negative influence on stability of the catalyst or formation of hydrocarbons having a long chain.[1]

[1] Gabriele Centi et al. Chem. Sus. Chem. 2011, 4, 1265-1273

Particularly, according to thesis by Yao et al., if $CO_2$/$(CO+CO_2)$>50%, i.e., if $CO_2$ is not inert gas or dilute gas, carbon dioxide may be converted into a hydrocarbon product, and a test in which a molar ratio of $H_2/CO/CO_2$ varies under conditions of a temperature of 473 K and a pressure of 20 bar shows results that, as the content of $CO_2$ increases, hydrocarbon having higher methane selectivity may be produced.[2]

[2] Yali Yao et al. Ind. Eng. Chem. Res. 2010, 49, 11061-11066

Therefore, in order to reduce variables for stability of the catalyst and the product due to carbon dioxide, development of an additional apparatus which may provide a constant $H_2/CO$ molar ratio while removing $CO_2$, is required.

As will described in the following examples, it may be confirmed that, when, among integrated molar velocities at the reforming reactor, the gas purification unit and the front end of the Fischer-Tropsch synthesis reactor, thermodynamically calculated according to a supply ratio of water based on a stranded gas field including 20% of $CO_2$, a $H_2/CO$ molar ratio is 2, a molar ratio of $CH_4$ to $H_2O$ to $CO_2$ suitable as a raw material is 1:1.6:0.7, and influence on carbon efficiency by carbon dioxide may be confirmed through synthetic fuel prepared according to such a molar ratio Further, through the carbon dioxide removal process, an optimum $H_2/CO$ molar ratio suitable for the Fischer-Tropsch synthesis reactor using the cobalt (Co)-based catalyst, i.e., a $H_2/CO$ molar ratio preferably of 1.8-2.2, more preferably of 2.0-2.05, may be provided and it may be confirmed therethrough that synthetic fuel having the above $H_2/CO$ molar ratio is favorable in terms of carbon utilization efficiency.

Hereinafter, the following examples illustrate the invention and are not intended to limit the same.

The following examples include data regarding change in a molar ratio of synthetic gas after the reforming reaction according to existence and nonexistence of the gas purification unit 60 in which the PSA device ($CO_2$ separation device) 62 and the bypass unit 63 are disposed in parallel, and include result values acquired through a commercial process simulation program.

EXAMPLES

Table 1 below represents effects according to increase in the amount of carbon dioxide ($CO_2$), if the gas purification unit 60 in accordance with the present invention is provided.

TABLE 1

| Standard gas $CO_2$ (kmol/h) | 0.1 | 0.2 | 0.3 | 0.4 |
|---|---|---|---|---|
| $CH_4$ at rear end of pre-reformer (kmol/h) | 1 | 1 | 1 | 1 |
| $CO_2$ additional input amount to pre-reformer (kmol/h) | 0.6035 | 0.5074 | 0.4074 | 0.3074 |
| $H_2O$ supply amount to pre-reformer (kmol/h) | 1 | 1 | 1 | 1 |
| $CO_2$ at rear end of pre-reformer (kmol/h) | 0.7035 | 0.7074 | 0.7074 | 0.7074 |
| $H_2O$ at rear end of pre-reformer (kmol/h) | 1.6 | 1.6 | 1.6 | 1.6 |

TABLE 1-continued

| Standard gas $CO_2$ (kmol/h) | 0.1 | 0.2 | 0.3 | 0.4 |
|---|---|---|---|---|
| $CO_2$ at rear end of reforming reactor (in front of gas purification unit) (kmol/h) | 0.4269 | 0.4286 | 0.4286 | 0.4286 |
| $H_2$ at rear end of reforming reactor (in front of gas purification unit) (kmol/h) | 2.2107 | 2.2098 | 2.2098 | 2.2098 |
| CO at rear end of reforming reactor (in front of gas purification unit) (kmol/h) | 1.1058 | 1.1083 | 1.1083 | 1.1083 |
| $H_2$/CO molar ratio at rear end of reforming reactor (in front of gas purification unit) | 1.9991861 | 1.9938645 | 1.9938645 | 1.9938645 |
| Distribution amount ($F_1$) to PSA device of gas purification unit (kmol/h) | 2.8737 | 2.8759 | 2.8759 | 2.8759 |
| Distribution amount ($F_2$) to bypass unit of gas purification unit (kmol/h) | 1.0649 | 1.0657 | 1.0657 | 1.0657 |
| Split ratio ($F_1/F_2$) | 2.6985632 | 2.6986019 | 2.6986019 | 2.6986019 |
| $H_2$/CO molar ratio at front end of Fischer-Tropsch synthesis reactor (at the rear of gas purification unit) | 2.0052636 | 2 | 2.0001811 | 2.0001811 |
| $H_2$ at front end of Fischer-Tropsch synthesis reactor (at the rear of gas purification unit) (kmol/h) | 2.2096 | 2.2088 | 2.2088 | 2.2088 |
| CO at front end of Fischer-Tropsch synthesis reactor (at the rear of gas purification unit) (kmol/h) | 1.1019 | 1.1044 | 1.1043 | 1.1043 |
| $CO_2$ at front end of Fischer-Tropsch synthesis reactor (at the rear of gas purification unit) (kmol/h) | 0.0399 | 0.04 | 0.04 | 0.04 |

In Table 1, "Stranded gas $CO_2$" represents the amount of carbon dioxide ($CO_2$) in natural gas from a stranded gas field, supplied to the pre-reformer 40, "$CH_4$ at rear end of pre-reformer" represents the amount of methane ($CH_4$) in raw gas supplied from the pre-reformer 40 to the reforming reactor 50, and "$CO_2$ additional input amount to pre-reformer" represents the amount of carbon dioxide ($CO_2$) additionally input to the pre-reformer 40.

Further, "$H_2O$ supply amount to pre-reformer" represents the amount of steam ($H_2O$) supplied to the pre-reformer 40, and "$CO_2$ at rear end of pre-reformer" represents the amount of carbon dioxide ($CO_2$) in the raw gas supplied from the pre-reformer 40 to the reforming reactor 50 and thus corresponds to the sum of "Stranded gas $CO_2$" and "$CO_2$ additional input amount to pre-reformer".

In the simulation, a molar ratio of $CH_4$ to $H_2O$ to $CO_2$ in the raw gas supplied to the reforming reactor 50 is set to 1:1.6:0.7.

Further, "$CO_2$ at rear end of reforming reactor (in front of gas purification unit)", "$H_2$ at rear end of reforming reactor (in front of gas purification unit)" and "CO at rear end of reforming reactor (in front of gas purification unit)" respectively represent the amounts of carbon dioxide ($CO_2$), hydrogen ($H_2$) and carbon monoxide (CO) in synthetic gas supplied from the reforming reactor 50 before passing through the gas purification unit 60.

Further, "$H_2$/CO molar ratio at rear end of reforming reactor (in front of gas purification unit)" represents the ratio of hydrogen ($H_2$) to carbon monoxide (CO) (i.e., the $H_2$/CO molar ratio) included in the synthetic gas before passing through the gas purification unit 60.

Further, "Distribution amount ($F_1$) to PSA device of gas purification unit" and "Distribution amount ($F_2$) to bypass unit of gas purification unit" represent the amounts of parts of the synthetic gas respectively distributed to the PSA device 62 and the bypass unit 63 of the parallel-type gas purification unit 60 shown in FIG. 2, and "Split ratio" of Table 1 represents a ratio of the amounts of the parts of the synthetic gas distributed to both sides.

Further, "$H_2$/CO molar ratio at front end of Fischer-Tropsch synthesis reactor (at the rear of gas purification unit)", "$H_2$ at front end of Fischer-Tropsch synthesis reactor (at the rear of gas purification unit)", "CO at front end of Fischer-Tropsch synthesis reactor (at the rear of gas purification unit)", and "$CO_2$ at front end of Fischer-Tropsch synthesis reactor (at the rear of gas purification unit)" respectively represent the $H_2$/CO molar ratio, the amount of hydrogen ($H_2$), the amount of carbon monoxide (CO) and the amount of carbon dioxide ($CO_2$) in the synthetic gas supplied to the Fischer-Tropsch synthesis reactor 70 after passing through the gas purification unit 60.

Consequently, according to the simulation results, as stated in Table 1, it may be understood that, if the parallel-type gas purification unit 60 is used, the $H_2$/CO molar ratio of the synthetic gas supplied to the Fischer-Tropsch synthesis reactor 70 may be controlled to 2, which is within the range of 1.8-2.2, regardless of the carbon dioxide ($CO_2$) content of natural gas from the stranded gas field.

That is, in accordance with the synthetic fuel preparation apparatus of the present invention, synthetic gas having a $H_2$/CO molar ratio (preferably of 1.8-2.2, more preferably of 2.0-2.05) optimized to the Co-based catalyst may be supplied to the Fischer-Tropsch synthesis reactor 70 regardless of the carbon dioxide content of a supplied raw material, and this means that the synthetic fuel preparation apparatus of the present invention using the parallel-type gas purification unit 60 is widely applicable to various stranded gas fields having natural gas including different carbon dioxide ($CO_2$) contents.

Further, the simulation results of Table 1 shows that synthetic gas having a $H_2$/CO molar ratio of 2.0 may be supplied to the Fischer-Tropsch synthesis reactor 70 and, if the supply velocity of the synthetic gas is adjusted, the size and capacity of the parallel-type gas purification unit 60 including the PSA device 62 may be minimized and thus initial investment costs may be reduced.

Table 2 below represents change in the $H_2$/CO molar ratio of synthetic gas according to compositions of raw gas, i.e., shows $H_2$/CO molar ratios of the synthetic gas if the steam ($H_2O$) content of the raw gas is varied.

TABLE 2

| Division | $H_2/CO$ Rear end of reforming reactor | Rear end of PSA device | Rear end of FTS (integration) | $CO_2$ at front end of FTS (mol %) |
|---|---|---|---|---|
| 1/1.2/0.7 | 1.897 | 1.903 | 1.899 | 4 |
| 1/1.5/0.7 | 1.953 | 1.959 | 1.956 | 4 |
| 1/1.6/0.7 | 2.008 | 2.016 | 2.012 | 4 |
| 1/1.8/0.7 | 2.116 | 2.125 | 2.121 | 4 |

In Table 2, "Rear end of reforming reactor" represents the $H_2/CO$ molar ratio of synthetic gas distributed to the rear end of the reforming reactor 50 and the bypass unit 63 of the gas purification unit 60, and "Rear end of PSA device" represents the $H_2/CO$ molar ratio of synthetic gas passed through the PSA device 62 of the gas purification unit 60.

In Table 2, "Rear end of FTS (integration)" represents the $H_2/CO$ molar ratio of the synthetic gas supplied to the Fischer-Tropsch synthesis reactor 70 via the gas purification unit 60, and "$CO_2$ at front end of FTS" represents the carbon dioxide ($CO_2$) content of the synthetic gas supplied to the Fischer-Tropsch synthesis reactor 70.

Further, Table 3 below represents compositions of raw gas of Examples 1 to 4 and $H_2/CO$ molar ratios of synthetic gas prepared from the raw gas and, in all of Examples 1 to 4, a molar ratio of $CH_4$ to $H_2O$ to $CO_2$ in the raw gas supplied to the pre-reformer 40 is set to 1:1.6:0.7.

TABLE 3

| Example | 1 | 2 | 3 | 4 |
|---|---|---|---|---|
| $CH_4$ (kmol/h) | 0.1255 | 0.0602 | 0.1193 | 0.1137 |
| CO (kmol/h) | 1.1629 | 0.6131 | 1.1602 | 1.157 |
| $CO_2$ (kmol/h) | 0.4111 | 0.0211 | 0.2145 | 0.0399 |
| $H_2O$ (kmol/h) | 0.0354 | 0.0187 | 0.0354 | 0.0354 |
| $H_2$ (kmol/h) | 2.335 | 1.2358 | 2.3343 | 2.3336 |
| $N_2$ (kmol/h) | 1.5 | 0.7941 | 1.4998 | 1.4995 |
| $CO_2$ content | 7% | 1% | 4% | 1% |
| Supply flow rate (ml/min) | 3159 | 1490 | 2924 | 2766 |
| Space velocity (l/h) | 6.94E−05 | 3.27E−05 | 6.40E−05 | 6.07E−05 |
| $H_2/CO$ molar ratio | 2.0079 | 2.01566 | 2.011981 | 2.01694 |

In Examples 1 to 4, the parallel-type PSA process (the carbon dioxide adjustment and separation/purification process executed by the gas purification unit 60) is varied under the condition that the molar ratio of $CH_4$ to $H_2O$ to $CO_2$ in the raw gas is set to 1:1.6:0.7. Here, economic feasibilities of the parallel-type gas purification unit 60 including the PSA device in Examples 1 to 4 are compared by comparing space velocities and synthetic fuel outputs according to $CO_2$ contents under the condition that the flow rate of $CH_4$ is fixed to 1 kmol/h.

Based on results of Table 3, it is determined that, if the Fischer-Tropsch synthesis reactor 70 having the same size is used, it is advantageous in terms of productivity of hydrocarbons of $C_5^+$ or higher to prepare synthetic fuel through the carbon dioxide adjustment and separation/purification process using PSA executed by the parallel-type gas purification unit 60.

Further, since a carbon dioxide content and a molar ratio of synthetic gas are adjusted through the carbon dioxide adjustment and separation/purification process using PSA executed by the parallel-type gas purification unit 60 without reaction catalyst exchange and any additional process according to carbon dioxide contents, the synthetic fuel preparation method of the present invention is effective in carbon utilization efficiency and energy efficiency due to characteristics of the GTL-FPSO process.

Further, according to research by Yali Yao et al.[2]) and by Jose Antonio Diaz et al.[4]), carbon dioxide may function as inert gas, or be added to hydrogenation in the catalyst and thus form a paraffin-based product having short hydrocarbon chains having plenty of methane according to contents thereof.

Figure 3:
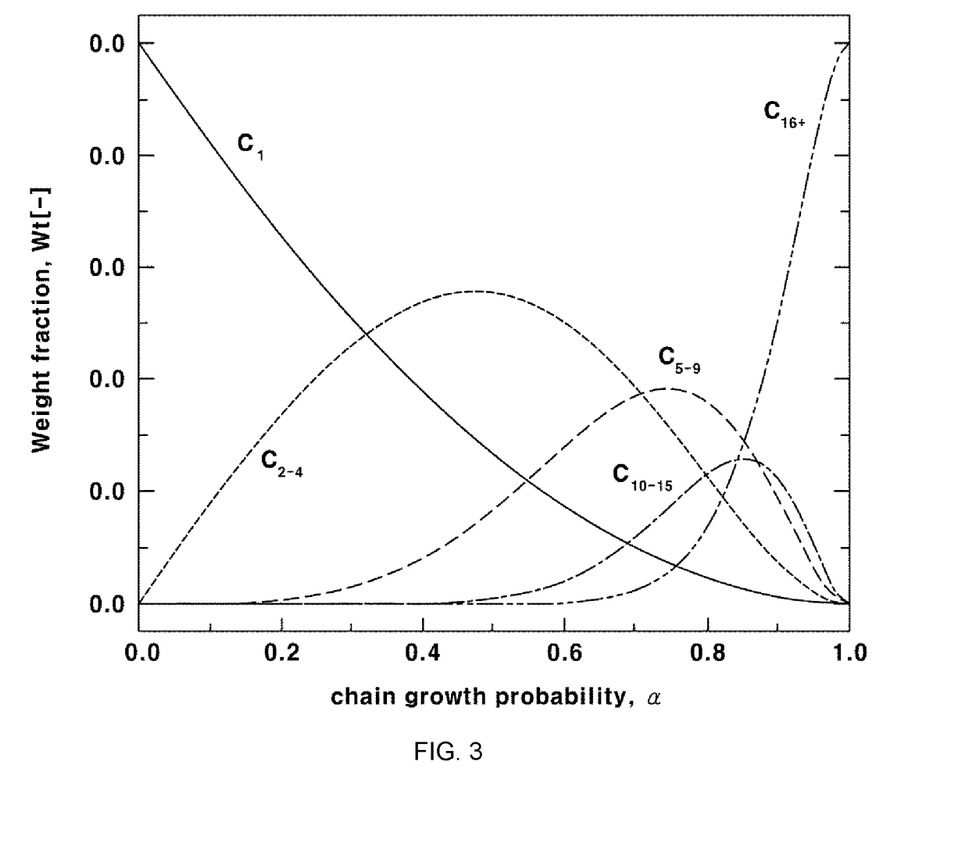
FIG. 3 is a reference graph illustrating the synthetic fuel preparation apparatus in accordance with the present invention.

According to research results by Yali Yao et al.[2]), when the amount of carbon dioxide increases, an ASF plot becomes a straight line, and an alpha value is lowered and thus short chains are mainly formed, as exemplarily shown in FIG. 3.[3])

[3]) Andreas Jess et al. Chem Eng Technol. 2009. 32, Tae Seok, Lee et al. Energy & Fuels. 2012. 26

[4]) Jose Antonio Diaz et al. Catalysis Communications 44 (2014) 57-61

FIG. 3 is a graph representing hydrocarbon selectivity as a function of a chain growth probability factor calculated using ASF.

Therefore, when synthetic gas is prepared according to a carbon dioxide content of natural gas of a stranded gas field, used as a raw material, a $H_2/CO$ molar ratio of the synthetic gas needs to be controlled so as to be suitable for the Fischer-Tropsch synthesis reaction, and carbon dioxide may be induced so as to function as inert gas or to be added to hydrogenation to form short hydrocarbon chains.

Further, even if carbon dioxide functions as inert gas, carbon dioxide affects the size of the Fischer-Tropsch synthesis reactor and thus removal of carbon dioxide in advance is effective in terms of the Fischer-Tropsch synthesis reactor, and the process executed by the parallel structure of the present invention in which the PSA device and the bypass unit are connected in parallel rather than the process executed by the PSA device alone may contribute to reduction in the size of the PSA device.

Since stranded gas fields have different carbon dioxide contents, in accordance with the present invention, raw gas may be prepared by adjusting a molar ratio of methane ($CH_4$) to steam ($H_2O$) to carbon dioxide ($CO_2$), and synthetic gas having a constant $H_2/CO$ molar ratio of 1.8-2.2 and a concentration of $CO_2$ adjusted preferably to 0.1-15 mol % (more preferably to 2.0-12 mol %) may be supplied to the Fischer-Tropsch synthesis reactor 70 using the cobalt (Co)-based catalyst by the parallel-type gas purification unit 60 disposed at the rear of the reforming reactor 50.

As is apparent from the above description, in an apparatus and method of preparing synthetic fuel in accordance with the present invention, a parallel-type gas purification unit for controlling a molar ratio of the synthetic fuel and a concentration of carbon dioxide, in which a $CO_2$ separation device and a bypass unit are disposed in parallel, is provided and, thereby, synthetic gas may be prepared by a steam carbon dioxide reforming (SCR) reaction using natural gas having different $CO_2$ contents of various stranded gas fields and then the synthetic fuel may be prepared using the synthetic gas in which a $H_2/CO$ molar ratio and a concentration of carbon dioxide are controlled by the gas purification unit.

For example, after the synthetic gas having a desired molar ratio may be prepared by the SCR reaction, the $CO_2$ separation device of the gas purification unit removes an unnecessary amount of carbon dioxide except for a minimum amount of carbon dioxide necessary for a Fischer-Tropsch synthesis (FTS) reactor to control heating, the synthetic gas passed through the $CO_2$ separation device mixes with synthetic gas passed through the bypass unit so that the concentration of $CO_2$ in the mixed synthetic gas is adjusted preferably to 0.1-15 mol % (more preferably to 2.0-12 mol %), and then the mixed synthetic gas may be supplied to the FTS reactor. Thereby, synthetic fuel may be prepared using optimum synthetic gas in which the $H_2/CO$ molar ratio and the concentration of carbon dioxide are adjusted.

Consequently, restriction on preparation of the synthetic fuel due to the $CO_2$ content of the synthetic gas supplied to the FTS reactor may be minimized.

Particularly, when synthetic fuel may be prepared using a GTL apparatus (in the present invention, being implemented as a "compact GTL apparatus") usable in stranded gas fields on land and a GTL apparatus and an FPSO process (in the present invention, being implemented as "compact GTL-FPSO technology") usable in stranded gas fields at sea, the parallel-type gas purification unit may supply optimum synthetic gas suitable for FTS reaction to prepare synthetic fuel from synthetic gas, and energy utilization efficiency and carbon utilization efficiency in an integrated process of a reforming reaction, an FTS reaction and an upgrading reaction to prepare synthetic fuel using natural gas including a large amount of $CO_2$ of a stranded gas field may be improved.

In addition, when natural gas of a stranded gas field is used as a raw material, carbon dioxide ($CO_2$) in synthetic gas may be recovered through the $CO_2$ separation device (for example, a PSA device) and recycled as a raw material of the SCR reaction and, thus, energy loss and greenhouse gas emissions may be maximally prevented and suppressed.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for preparing synthetic fuel using natural gas, comprising:
   a liquid separator configured to separate $C_5^+$ condensate and oil from the natural gas supplied from a stranded gas field;
   a desulfurizer configured to remove sulfur from $C_1$-$C_4$ gas obtained by separating the $C_5^+$ condensate and oil from the natural gas by the liquid separator;
   a pre-reformer configured to convert higher hydrocarbons having 2 or more carbon atoms in desulfurized gas, obtained by the desulfurizer, into methane;
   a reforming reactor configured to generate synthetic gas comprising hydrogen ($H_2$) and carbon monoxide (CO) through a Steam Carbon dioxide Reforming (SCR) reaction to reform methane using carbon dioxide and steam into hydrogen and carbon monoxide, after a pre-reforming process executed by the pre-reformer;
   a Fischer-Tropsch synthesis reactor configured to generate the synthetic fuel from the synthetic gas generated by the reforming reactor through a Fischer-Tropsch synthesis reaction; and
   a gas purification unit configured to control a $H_2/CO$ molar ratio of the synthetic gas and a concentration of carbon dioxide in the synthetic gas, and comprising a $CO_2$ separation device configured to separate and remove carbon dioxide from the synthetic gas and a bypass unit configured to divert a part of the synthetic gas so as not to pass through the $CO_2$ separation device, the $CO_2$ separation device and the bypass unit being disposed in parallel between the reforming reactor and the Fischer-Tropsch synthesis reactor,
   wherein, in the gas purification unit,
   the $CO_2$ separation device receives the synthetic gas supplied by the reforming reactor and transmits through a first supply line, selectively separates and removes carbon dioxide from the transmitted synthetic gas, and then supplies the synthetic gas comprising an adjusted amount of carbon dioxide to the Fischer-Tropsch synthesis reactor through a second supply line,
   the bypass unit comprises a bypass line branching off from the first supply line and connected to the second supply line and diverts a part of the synthetic gas through the bypass line so as not to pass through the $CO_2$ separation device so that the diverted part of the synthetic gas is supplied to the Fischer-Tropsch synthesis reactor through the second supply line,
   wherein the gas purification unit is configured to adjust the H2/CO molar ratio of the synthetic gas supplied from the reforming reactor to the Fischer-Tropsch synthesis reactor to 1.8-2.2,
   wherein the gas purification unit further comprises a flow control unit to control flow rates of parts of the synthetic gas respectively distributed to the CO2 separation device and the bypass unit, and
   wherein the gas purification unit is configured to adjust a concentration of carbon dioxide in the synthetic gas supplied to the Fischer-Tropsch synthesis reaction to 6-15 mol %.

2. The apparatus of claim 1, wherein the $CO_2$ separation device is a PSA device configured to separate and remove carbon dioxide from the synthetic gas by selectively adsorbing carbon dioxide.

3. The apparatus of claim 2, wherein a plurality of adsorbent beds of the PSA device has an emission line to emit carbon dioxide desorbed from an adsorbent so as to recover carbon dioxide.

4. The apparatus of claim 1, wherein the $CO_2$ separation device of the gas purification unit is a $CO_2$ separation device executing an amine process to separate and remove carbon dioxide from the synthetic gas by selectively adsorbing carbon dioxide.

5. The apparatus of claim 1, wherein the $CO_2$ separation device of the gas purification unit is a $CO_2$ separation device selectively separating and removing carbon dioxide from the synthetic gas using a membrane.

* * * * *